United States Patent
Zuta et al.

(10) Patent No.: US 11,182,915 B2
(45) Date of Patent: Nov. 23, 2021

(54) VISUAL, DEPTH AND MICRO-VIBRATION DATA EXTRACTION USING A UNIFIED IMAGING DEVICE

(71) Applicant: Guardian Optical Technologies Ltd., Tel-Aviv (IL)

(72) Inventors: Yoav Zuta, Tel-Aviv (IL); Gideon Carmon, Haifa (IL); Roi Levy, Rehovot (IL); Guy Raz, Binyamina (IL)

(73) Assignees: GENTEX CORPORATION, Zeeland, MI (US); GUARDIAN OPTICAL TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 16/615,827

(22) PCT Filed: Jul. 12, 2018

(86) PCT No.: PCT/IL2018/050761
§ 371 (c)(1),
(2) Date: Nov. 22, 2019

(87) PCT Pub. No.: WO2019/012534
PCT Pub. Date: Jan. 17, 2019

(65) Prior Publication Data
US 2020/0293750 A1    Sep. 17, 2020

Related U.S. Application Data

(60) Provisional application No. 62/531,417, filed on Jul. 12, 2017.

(51) Int. Cl.
*G06K 9/00*    (2006.01)
*G06T 7/521*    (2017.01)
(Continued)

(52) U.S. Cl.
CPC .......... *G06T 7/521* (2017.01); *G06K 9/00201* (2013.01); *G06K 9/00838* (2013.01);
(Continued)

(58) Field of Classification Search
CPC .... G06T 7/521; H04N 13/254; H04N 13/271; H04N 5/2226; G06K 9/00201; G06K 9/00838; G06K 9/2018; G06K 9/6256
(Continued)

(56) References Cited

U.S. PATENT DOCUMENTS 5,897,494 A    4/1999    Flock et al.
8,866,910 B1    10/2014    Cetin et al.
(Continued)

FOREIGN PATENT DOCUMENTS

CN    103913129    7/2014
CN    105513410    4/2016
(Continued)

OTHER PUBLICATIONS

International Preliminary Report on Patentability dated Jan. 23, 2020 From the International Bureau of WIPO Re. Application No. PCT/IL2018/050761. (6 Pages).
(Continued)

*Primary Examiner* — Stephen P Coleman
(74) *Attorney, Agent, or Firm* — Price Heneveld LLP; Brian James Brewer

(57) ABSTRACT

A unified imaging device used for detecting and classifying objects in a scene including motion and micro-vibrations by receiving a plurality of images of the scene captured by an imaging sensor of the unified imaging device comprising a light source adapted to project on the scene a predefined structured light pattern constructed of a plurality of diffused light elements, classifying object(s) present in the scene by visually analyzing the image(s), extracting depth data of the
(Continued)

object(s) by analyzing position of diffused light element(s) reflected from the object(s), identifying micro-vibration(s) of the object(s) by analyzing a change in a speckle pattern of the reflected diffused light element(s) in at least some consecutive images and outputting the classification, the depth data and data of the one or more micro-vibrations which are derived from the analyses of images captured by the imaging sensor and are hence inherently registered in a common coordinate system.

16 Claims, 5 Drawing Sheets

(51) Int. Cl.
  *H04N 13/254* (2018.01)
  *H04N 13/271* (2018.01)
  *H04N 5/222* (2006.01)
  *G06K 9/20* (2006.01)
  *G06K 9/62* (2006.01)

(52) U.S. Cl.
  CPC ......... *G06K 9/2018* (2013.01); *G06K 9/6256* (2013.01); *H04N 5/2226* (2013.01); *H04N 13/254* (2018.05); *H04N 13/271* (2018.05); *G06T 2207/30268* (2013.01)

(58) Field of Classification Search
  USPC .......................................................... 382/103
  See application file for complete search history.

(56) References Cited

U.S. PATENT DOCUMENTS

| | | | |
|---|---|---|---|
| 9,651,477 B1 | 5/2017 | Libbey et al. | |
| 2005/0237423 A1 | 10/2005 | Nilson et al. | |
| 2005/0276566 A1* | 12/2005 | Iimura | G02B 6/0018 385/146 |
| 2006/0042851 A1 | 3/2006 | Herrmann et al. | |
| 2007/0159607 A1 | 6/2007 | Nishigaki | |
| 2010/0118123 A1 | 5/2010 | Freedman et al. | |
| 2010/0284082 A1 | 11/2010 | Shpunt et al. | |
| 2011/0211044 A1 | 9/2011 | Shpunt et al. | |
| 2011/0310220 A1 | 12/2011 | McEldowney | |
| 2011/0310226 A1 | 12/2011 | McEldowney | |
| 2013/0038881 A1 | 2/2013 | Pesach et al. | |
| 2014/0049609 A1 | 2/2014 | Wilson et al. | |
| 2015/0097947 A1 | 4/2015 | Hudman et al. | |
| 2016/0046298 A1 | 2/2016 | DeRuyck et al. | |
| 2016/0253821 A1 | 9/2016 | Romano et al. | |
| 2016/0254638 A1 | 9/2016 | Chen et al. | |
| 2016/0328882 A1 | 11/2016 | Lee et al. | |
| 2017/0178272 A1* | 6/2017 | Lashkari | G06T 19/006 |
| 2018/0060639 A1* | 3/2018 | Lee | G06K 9/00087 |

FOREIGN PATENT DOCUMENTS

| | | |
|---|---|---|
| CN | 106216815 | 12/2016 |
| EP | 2198790 | 6/2010 |
| WO | WO 2016/020966 | 2/2016 |
| WO | WO 2016/103271 | 6/2016 |
| WO | WO 2019/012534 | 1/2019 |
| WO | WO 2019/012535 | 1/2019 |

OTHER PUBLICATIONS

International Preliminary Report on Patentability dated Jan. 23, 2020 From the International Bureau of WIPO Re. Application No. PCT/IL2018/050762. (8 Pages).
International Search Report and the Written Opinion dated Nov. 5, 2018 From the International Searching Authority Re. Application No. PCT/IL2018/050761. (9 Pages).
International Search Report and the Written Opinion dated Nov. 5, 2018 From the International Searching Authority Re. Application No. PCT/IL2018/050762. (14 Pages).
Official Action dated May 28, 2020 from the US Patent and Trademark Office Re. U.S. Appl. No. 16/614,390. (22 pages).
Notification of Office Action and Search Report dated Nov. 25, 2020 From the State Intellectual Property Office of the People's Republic of China Re. Application No. 201880045940.9 and a Machine Translation of the Office Action Into English. (25 Pages).
Official Action dated Dec. 1, 2020 From the US Patent and Trademark Office Re. U.S. Appl. No. 16/614,390. (24 Pages).
Notification of Office Action and Search Report dated Apr. 20, 2021 From the State Intellectual Property Office of the People's Republic of China Re. Application No. 201880045940.9. (12 Pages).
Translation Dated May 20, 2021 of Notification of Office Action dated Apr. 20, 2021 From the State Intellectual Property Office of the People's Republic of China Re. Application No. 201880045940. 9. (12 Pages).
Supplementary European Search Report and the European Search Opinion dated Feb. 16, 2021 From the European Patent Office Re. Application No. 18831755.6. (10 Pages).
Supplementary European Search Report and the European Search Opinion dated Mar. 25, 2021 From the European Patent Office Re. Application No. 18831109.6. (11 Pages).
Bianchi "Vibration Detection by Observation of Speckle Patterns", Applied Optics, XP001587747, 53(5): 931-936, Published Online Feb. 6, 2014.

* cited by examiner

VISUAL, DEPTH AND MICRO-VIBRATION DATA EXTRACTION USING A UNIFIED IMAGING DEVICE

RELATED APPLICATIONS

This application is a National Phase of PCT Patent Application No. PCT/IL2018/050761 having International filing date of Jul. 12, 2018, which claims the benefit of priority under 35 USC § 119(e) of U.S. Provisional Patent Application No. 62/531,417 entitled "SYSTEMS AND METHODS FOR ACQUIRING INFORMATION FROM AN ENVIRONMENT" filed on Jul. 12, 2017.

PCT Patent Application No. PCT/IL2018/050761 is also related to PCT Patent Application No. PCT/IL2015/051255 (Publication WO2016/103271) entitled "SYSTEM AND METHOD FOR DETECTING SURFACE VIBRATIONS" filed on Dec. 27, 2015.

The contents of the above applications are all incorporated by reference as if fully set forth herein in their entirety

BACKGROUND

The present invention, in some embodiments thereof, relates to analyzing images captured by a unified imaging device to detect objects in a scene, and, more specifically, but not exclusively, analyzing images captured by a unified imaging device projecting a structured light pattern to detect objects in the scene including motion and micro-vibrations thereof.

Automated object detection methods and systems are attracting a continuously growing attention as they may be applied for a plurality of systems, services and/or applications ranging from commercial applications, entertainment applications to automated and/or autonomous vehicles and many more.

Object and people detection including motion and/or micro-vibrations detection is a highly challenging task and a lot of research is therefore invested by many stakeholders to develop and deploy tools, algorithms and methods for accurately detecting and classifying objects present in a scene.

SUMMARY

According to a first aspect of the present invention there is provided a computer implemented method of detecting objects, extracting depth information of the objects and identifying micro-vibrations of the objects using a unified imaging device, comprising using one or more processors for:
  Receiving a plurality of images of a scene captured by an imaging sensor of a unified imaging device comprising a light source adapted to project on the scene a predefined structured light pattern constructed of a plurality of diffused light elements.
  Classifying one or more objects present in the scene by visually analyzing one or more of the plurality of images.
  Extracting depth data of the one or more objects by analyzing a position of one or more of the plurality of diffused light elements reflected from the one or more objects.
  Identifying one or more micro-vibrations of the one or more objects by analyzing a change in a speckle pattern of one or more of the plurality of reflected diffused light elements in at least some consecutive images of the plurality of images.
  Outputting the classification, the depth data and data of the one or more micro-vibrations which are derived from the analyses of images captured by the imaging sensor and are hence inherently registered in a common coordinate system.

According to a second aspect of the present invention there is provided a unified imaging device, comprising:
  A light source adapted to project a predefined structured light pattern on a scene, the predefined structured light pattern comprising a plurality of diffused light elements.
  An imaging sensor adapted to capture a plurality of images of the scene.
  At least some of the plurality of images are analyzed to classify one or more objects present in the scene, to extract depth data of the object(s) and to identify one or more micro-vibrations of the object(s). The classification, the depth data and the micro-vibration(s) are derived from the simultaneous analyses of the at least some images and are hence inherently registered in a common coordinate system.

Since the visual data, the depth data and the micro-vibration data are all derived from the same captured images they are all inherently registered to a common coordinate system. The data extracted from the various modalities may therefore be easily correlated with the respective object(s) present in the scene, for example, a person, an item, a background and/or the like according to the spatial coordinates of the extracted data. Moreover, the data extracted from the various modalities may be fused together for one or more objects present in the scene according to the spatial coordinates of the extracted data.

In a further implementation form of the first and/or second aspects, the light source and the imaging sensor operate in a common light wavelength spectrum which is a member of a group consisting of: visible light, infrared light and ultra-violet light. operating in a wide light spectrum may allow easy integration, adaptation and/or adoption of the unified imaging device in a plurality of systems and/or applications which may require different lighting conditions, for example, day, night and/or the like.

In a further implementation form of the first and/or second aspects, the classification, the depth data and the one or more micro-vibrations derived from the analyses of images captured by the imaging sensor are time synchronized. As the classification, motion and micro-vibration data are derived from analysis of common images captured by the same imaging sensor (of the unified imaging device) they may also be inherently time (temporally) synchronized thus further simplifying correlation of the derived data with the object(s) in the scene.

In a further implementation form of the first and/or second aspects, each of the plurality of diffused light elements is, for example, a dot, a spot, a line and/or a combination thereof. The unified imaging device may be adapted, configured and/or controlled to project the structured light pattern to include one or more of the various types of diffused light elements according to the physical parameters of the scene, according to lighting conditions, according to analysis requirements and/or the like.

In an optional implementation form of the first and/or second aspects, the light source is further adapted to periodically emit the structured light pattern such that the reflected structured light pattern is depicted in a subset of the plurality of images. The captured images which do not depict the reflected structured light pattern may support a more accurate visually analysis since artifacts and/or visual affects induced by the reflected structured light pattern are not present in these images.

In a further implementation form of the first and/or second aspects, the visual analysis comprising using one or more trained machine learning models for classifying the object(s). Using the trained machine learning model(s) may allow for efficient, automatic and constant evolution to adapt to new scenarios, new objects and/or the like thus significantly improving reliability and accuracy of the detection and classification.

In a further implementation form of the first and/or second aspects, one or more of the machine learning model(s) are trained for classifying the object(s) based on the visual data depicted in the image(s). The visual data comprising visual data of the object(s) and one or more of the reflected diffused light elements. In addition to analyzing the visual properties of the object(s) as depicted in the captured image(s), the machine learning model(s) may be trained to detect and classify the object(s), is attribute(s) and/or motion according to the visual properties of the reflected structured light pattern in order to improve accuracy, reliability and/or the like fort the classification.

In a further implementation form of the first and/or second aspects, one or more of the machine learning model(s) are trained for classifying the object(s) according to visual data of the object(s) depicted in the image(s) combined with one or more depth maps generated based on the extracted depth data. The machine learning model(s) may be trained to receive data from both modalities, i.e. the visual data in the captured images and the depth maps created based on the depth data to detect and classify the object(s), is attribute(s) and/or motion.

In a further implementation form of the first and/or second aspects, the change in the speckle pattern is identified by analyzing a temporal standard deviation in an intensity of one or more of the reflected diffused light elements in the at least some consecutive images compared to a threshold value. Measuring the speckle pattern change based on the temporal standard deviation may significantly improve accuracy and/or reliability of the detected change since the standard deviation measured over time (i.e. consecutive images) may be simply compared to the threshold to identify the change.

In an optional implementation form of the first and/or second aspects, the temporal standard deviation is averaged by calculating the temporal standard deviation for multiple reflected diffused light elements reflected from a surface of a respective object(s). Averaging the temporal standard deviation over multiple speckle patterns may significantly increase the Signal to Noise Ratio (SNR) of the intensity of the speckle pattern and improve immunity to noise which may affect the intensity level of the speckle pattern.

In a further implementation form of the first and/or second aspects, the change in the speckle pattern is identified by applying a speckle pattern translation to the speckle pattern to determine an angular velocity of one or more points in the speckle pattern with respect to one or more adjacent points in the speckle pattern. The angular velocity is indicative of the micro-vibration(s). Applying the speckle pattern translation may be an effective and efficient method for identifying the change in the speckle pattern.

In an optional implementation form of the first and/or second aspects, the intensity of one or more of the points in the speckle pattern is averaged by applying a temporal sliding window over the one or more points in multiple consecutive images of the plurality of images. The sliding window may be an efficient and effective method for temporally averaging the intensity of the speckle pattern point(s) over time to smooth the intensity in order to significantly reduce and potentially eliminate noise effects.

In an optional implementation form of the first and/or second aspects, the intensity of one or more of the points in the speckle pattern is averaged by applying an infinite response filter to the intensity of the respective point(s) and dividing a result of the filter by an averaged intensity calculated based on the intensity measured in multiple consecutive images of the plurality of images. The infinite response filter may be an efficient and effective method for temporally averaging the intensity of the speckle pattern point(s) over time to smooth the intensity in order to significantly reduce and potentially eliminate noise effects.

In an optional implementation form of the first and/or second aspects, the intensity of one or more of the points in the speckle pattern is averaged by calculating the intensity for multiple adjacent points in the speckle pattern. Spatially averaging the intensity of multiple points in the speckle pattern may significantly reduce and potentially eliminate noise effects which may be present in one or more of the points.

In a further implementation form of the first and/or second aspects, the scene is cabin of a vehicle. Deploying the unified imaging device in the vehicle cabin may be highly valuable for analyzing the captured images to detect and classify vehicle occupants (e.g. driver, passenger(s), pet(s), etc.) and/or other items present in the cabin including attribute(s), motion and micro-vibrations.

In a further implementation form of the first and/or second aspects, the extracted classification, depth data and micro-vibration(s) are analyzed to derive one or more of: a vehicle occupants count, a position and movement of the vehicle occupant(s), a posture of the vehicle occupant(s), a head and body parts position of the vehicle occupant(s), an activity of the vehicle occupant(s), a presence of one or more item associated the vehicle occupant(s) and/or the like. Using the classification, notion and/or micro-vibration data may be highly beneficial for the plurality of vehicle related application.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
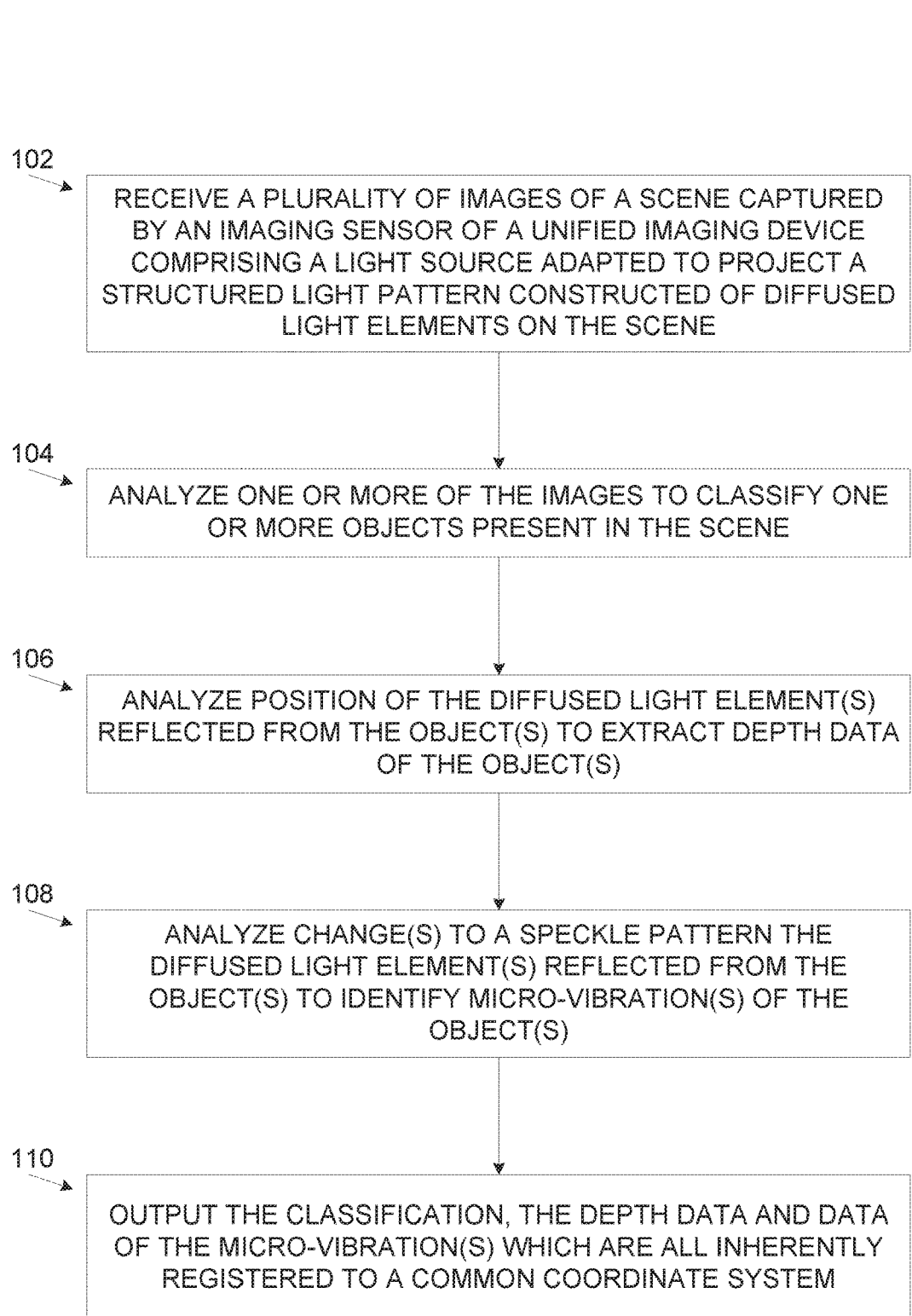
FIG. 1 is a flowchart of an exemplary process of analyzing images captured by a unified imaging apparatus depicting a scene to extract imagery data, depth data and micro-vibration data of objects in the scene, according to some embodiments of the present invention.

The present invention, in some embodiments thereof, relates to analyzing images captured by a unified imaging device to detect objects in a scene, and, more specifically, but not exclusively, analyzing images captured by a unified imaging device projecting a structured light pattern to detect objects in the scene including motion and micro-vibrations thereof.

According to some embodiments of the present invention, there are provided devices, methods and systems for detecting and classifying one or more objects present in a scene including motion and micro-vibrations (small and subtle movement) of the objects and/or part(s) thereof by analyzing visual data, depth data and speckle pattern(s) extracted from images captured by a unified imaging device.

The unified imaging device includes a light source in particular a coherent light source, for example, a laser and/or the like configured to emit a structured light pattern comprising a plurality of diffused light elements, for example, a dot, a spot, a line, a shape and/or a combination thereof projected on the scene. The unified imaging device further includes an imaging sensor, for example, a camera, an infrared camera and/or the like adapted to capture a plurality of images of the scene. As such at least some images captured by the imaging sensor depict a reflection of the structured light pattern comprising one or more diffused light elements reflected from the object(s) present in the scene.

One or more trained machine learning models and/or algorithms, for example, a neural network, a Support Vector Machine (SVM), a decision tree learning algorithm, a K-Nearest neighbors algorithm and/or the like may be applied to the captured images in order to detect and classify one or more objects present in the scene, for example, a human, an item and/or the like. The captured images may be further analyzed to identify one or more attributes of the detected object(s), for example, a motion, a gesture, a facial expression, a bodily positioning, a limb positioning, a size, a shape and/or the like.

Optionally, the machine learning model(s) and/or algorithm(s) may be constructed and trained with training datasets comprising training images depicting the reflected structured light patterns indicative of depth and distance of the object(s) and/or part(s) thereof such that the objects may be detected and classified based on classification of the visual data depicted in the image(s) and optionally according to classification of the reflected structured light pattern. The trained machine learning model(s) and/or algorithm(s) may be applied to one or more of the captured images to improve the detection and classification of the object(s).

One or more of the captured images may be analyzed to extract depth data of the scene, for example, the position of diffused light elements reflected from the object(s) may be analyzed to extract the depth data relating to the object(s). The depth data may be extracted based on triangulation of the reflected diffused light elements. Additionally and/or alternatively, the depth data may be extracted based on a calibration process in which pixels locations in the captured images are associated with respective distance (depth) values and stored in a dataset, for example, a lookup table, a list, a database and/or the like. One or more depth maps of the scene may be generated based on the extracted depth data.

The machine learning model(s) and/or algorithm(s) may be further applied to the depth map(s) typically in conjunction with the captured images to improve detection and classification of the object(s) present in the scene and/or of their identified attribute(s).

Furthermore, at least some of the captured images may be analyzed to identify micro-vibrations of the object(s). The micro-vibration(s) may be very subtle, minor and/or limited movements of the object(s) an/or part(s) on a scale of, for example, micro-radians, for example, respiration, eye movement, eyelid movement, subtle limb movement, a subtle head movement and/or the like and may thereof not be detected by analyzing the depth data. The micro-vibration(s)

may be detected by analyzing a speckle pattern of one or more of the diffused light patterns reflected from the object(s). In particular, changes to the speckle pattern(s) are analyzed which may be indicative of the subtle micro-vibrations.

The different modalities relating to the object(s) on scene, i.e. the visual data, the depth data and the speckle patterns are all extracted from the same images captured by the same imaging sensor integrated in the unified imaging device. The object(s) detected based on the visual data analysis and/or the depth data analysis, the motion detected based on the depth data analysis and the micro-vibration detected based on the speckle pattern(s) analysis are therefore inherently registered to a common coordinate system and are therefore inherently spatially aligned. Moreover, since the object(s) classification, motion and micro-vibration data are derived from analysis of common images captured by the same imaging sensor (of the unified imaging device) they may also be inherently time (temporally) synchronized.

According to some embodiments of the present invention the unified imaging device is deployed, for example, installed, mounted, integrated, embedded and/or the like in small and/or limited spaces such as, for example, a vehicle cabin and/or the like. The images captured by the imaging sensor may be analyzed to detect and classify one or more vehicle occupants (i.e. a driver, a passenger, a pet) including their attributes, motion and micro-vibrations. The captured images may be further analyzed to detect and classify one or more objects present in the vehicle cabin, for example, a seat, a hand rest, a window, a door, an item placed in the cabin (e.g. a child seat, a shopping bag, a briefcase, etc.) and/or the like.

Detecting the object(s), their attributes and the respective micro-vibrations by analyzing images captured by the unified imaging device may present significant advantages and benefits compared to currently existing methods and systems for detecting objects in a scene.

First, using the data execrated from the different modalities, i.e. the visual data, the depth data and the speckle patterns(s) to detect the object(s), their attribute(s) and/or their related micro-vibrations may significantly improve accuracy of the classification of these objects compared to existing methods which may typically base the detection and/or classification based on a single modality.

Moreover, using the trained machine learning model(s) and/or algorithm(s) may support automatic and constant evolution for adapting to new scenarios, new objects and/or the like thus significantly improving reliability and accuracy of the detection and classification. In particular, the machine learning model(s) and/or algorithm(s) are superior to existing methods which may employ rule based algorithms requiring constant and major maintenance to update them for the new scenarios.

Furthermore, since the visual data, the depth data and the micro-vibration data are all derived from the same captured images they are all inherently registered to a common coordinate system. The data extracted from the various modalities may therefore be easily correlated with the respective object(s) present in the scene according to the spatial coordinates of the extracted data. Moreover, the data extracted from the various modalities may be fused together for one or more objects present in the scene according to the spatial coordinates of the extracted data. In addition, since the object(s) classification, motion and micro-vibration data are derived from analysis of common images captured by the same imaging sensor (of the unified imaging device) they may also be inherently time (temporally) synchronized.

This may be a major advantage compared to the existing methods which may use separate capturing devices and/or sensors for capturing each of the visual data, the depth data and/or the micro-vibration data. The separate capturing devices may require a complex and significantly less accurate for registering to a common coordinate system.

Also, since the light source and the imaging sensor are integrated in the same unified device, they may be easily calibrated both spatially and temporally. Moreover, system cost, size and/or deployment complexity may be significantly reduced by integrating the light source and the imaging sensor into a single unified imaging device which is used for extracting all modalities data (i.e. visual data, depth data and speckle pattern data) to classify the object(s), their attribute(s), their motion and their micro-vibrations.

Deploying the unified imaging device in the vehicle cabin and analyzing the captured images to detect and classify the vehicle occupants as well as other objects present in the cabin may be useful for a plurality of applications, for example, driver monitoring, passenger safety, forgotten infant (or pets) monitoring, passenger comfort, infotainment, vehicle security (intruder alert) and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of analyzing images captured by a unified imaging apparatus depicting a scene to extract visual data, depth data and micro-vibration data of objects in the scene, according to some embodiments of the present invention. An exemplary process 100 may be executed to analyze images captured by a unified imaging device adapted to project a structured light pattern on a scene, in particular a small and/or limited space such as a vehicle cabin and/or the like to identify one or more objects in the scene, including motion and micro-vibrations of one or more of the detected objects.

The unified imaging device comprises an integrated light source for projecting the structured light pattern on the scene. The projected structured light pattern constructed of a plurality of diffused light elements, for example, a dot, a spot, a line, a shape and/or a combination thereof may be reflected by one or more objects present in the scene and captured by an imaging sensor integrated in the unified imaging device.

Depth data relating to the objects present in the scene may be extracted by analyzing a position of one or more of the diffused light elements reflected back from the object(s) in the scene.

The captured images optionally including extracted depth data (depth maps) may be analyzed using one or more machine learning models and/or algorithms constructed and trained to detect and/or classify the object(s) in the scene. The machine learning model(s) and/or algorithm(s) may be further applied to the images and/or to the depth data to identify motion of the object(s) in the scene.

One or more of the diffused light elements reflected back from the object(s) in the scene, specifically a speckle pattern of the reflected diffused light elements may be analyzed to identify micro-vibration which may be expressed by extremely subtle motion and/or movement on a scale of, for example, micro-radians which may not be detected by analyzing the extricated depth data.

The different modalities relating to the object(s) on scene, i.e. the visual data, the depth data and the speckle patterns are all extracted from the same images captured by the same imaging sensor integrated in the unified imaging device which also integrates the light source projecting the structured light pattern. The object(s) detected based on the visual data analysis and/or the depth data analysis, the motion detected based on the depth data analysis and the micro-vibration detected based on the speckle pattern(s) analysis are therefore inherently registered to a common coordinate system and are therefore inherently spatially aligned. Due to the inherent registration, the data extracted from the various modalities may be easily correlated and/or fused together for one or more objects present in the scene according to the spatial coordinates of the extracted data. Moreover, since the object(s) classification, motion and micro-vibration data are derived from analysis of common images captured by the same imaging sensor (of the unified imaging device) they may also be inherently time (temporally) synchronized.

Figure 2:
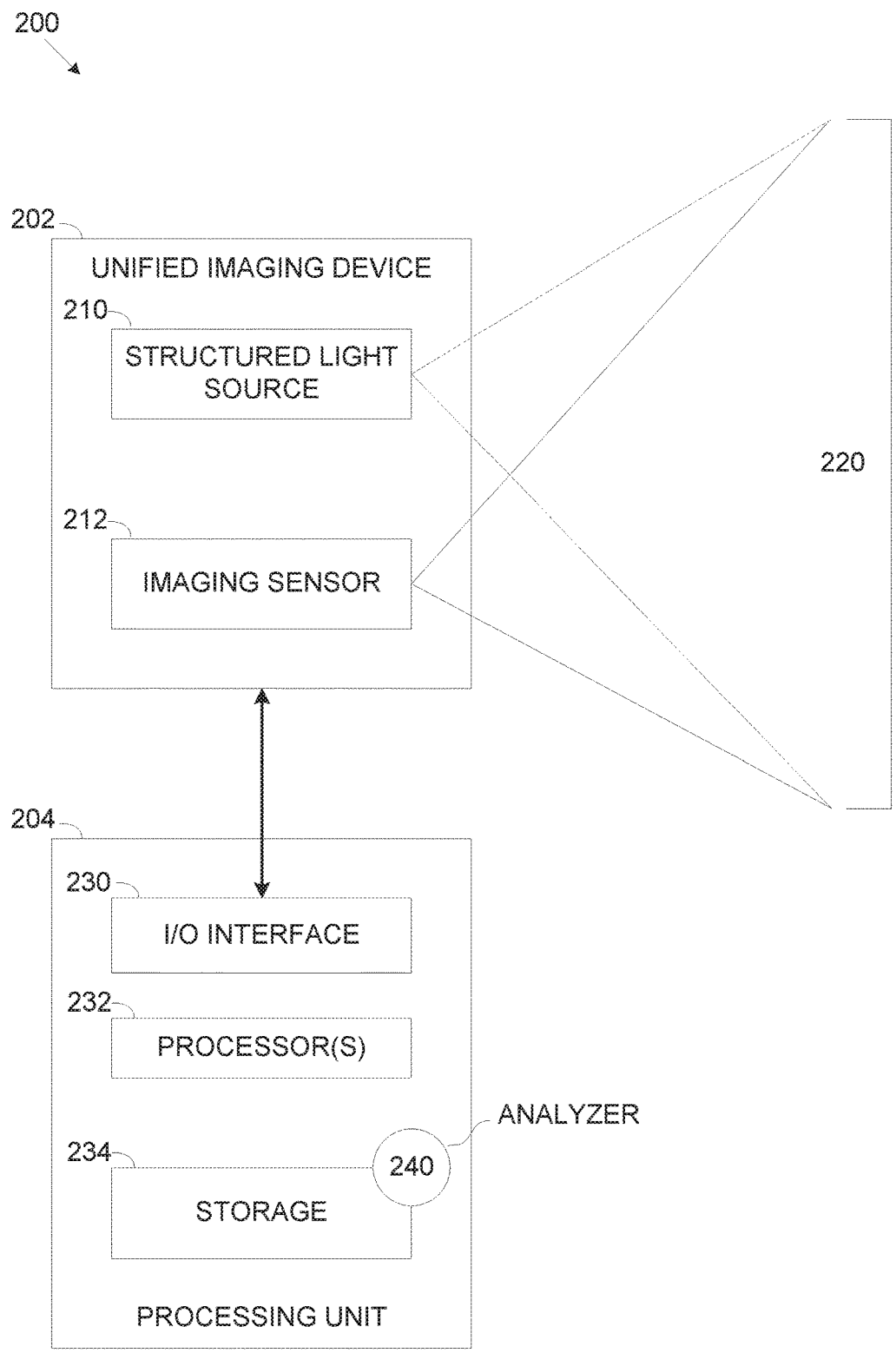
FIG. 2 is a schematic illustration of an exemplary unified imaging apparatus capturing images of a scene for analysis to extract imagery data, depth data and micro-vibration data of objects in the scene, according to some embodiments of the present invention.

Reference is also made to FIG. 2, which is a schematic illustration of an exemplary unified imaging apparatus capturing sensory data of a scene for analysis to extract visual data, depth data and micro-vibration data of objects in the scene, according to some embodiments of the present invention. An exemplary imaging system 200 may include a unified imaging device 202 and a processing unit 204 deployed to monitor a scene 220 in order to detect and classify one or more object(s) present in the scene 220.

According to some embodiments of the present invention the system 200 may be installed, mounted, integrated and/or embedded in a vehicle, specifically in a cabin of the vehicle such that the scene 220 is the cabin interior and the object(s)

present in the cabin may include, for example, one or more a vehicle occupant (e.g. a driver, a passenger, a pet, etc.), one or more objects associated with the cabin (e.g. seta, door, window, head rest, arm rest, etc.), an item associated with one or more of the vehicle occupant(s) (e.g. an infant seat, a pet cage, a briefcase, a toy, etc.) and/or the like.

Optionally the unified imaging device 202 and a processing unit 204 are integrated together in a single device.

The unified imaging device 202 comprises a light source 210 adapted to project a structured light pattern on the scene 220, for example in one or more light spectrums, for example, visible light (400-700 nm), near infrared (700-1200 nm), near ultraviolet (100-400 nm) and/or the like. The structured light pattern may be constructed of a plurality of diffused light elements, for example, a dot, a light and/or a combination thereof. In particular, the light source 210 may be a coherent light source, for example, a laser and/or the like configured to emit coherent light such that the structured light pattern is a coherent structured light pattern.

The unified imaging device 202 comprises an imaging sensor 212, for example, a camera, an infrared camera and/or the like to capture images of the scene 220. The imaging sensor 212 is further adapted to capture reflections of the diffused light elements of the structured light pattern reflected from objects present in the scene 220. As such the imaging sensor 212 may be adapted to operate in the light spectrum(s) applied by the light source 210 in order to capture the reflected structured light pattern.

The imaging sensor 212 is spatially aligned with the light source 210 according to known and predefined alignment parameters. A calibration sequence may be done to ensure the spatial alignment between the imaging sensor 212 and the light source 210. The calibration may be done by locating one or more calibration target objects having known and recorded positioning characteristics at a predefined location in front of the unified imaging device 202, operating the light source 210 to project the structured light pattern and mapping the (known) distances to depth data extracted from calibration images(s) captured by the imaging sensor 212 and portraying the calibration target object(s). The calibration may be done once during production of the unified imaging device 202, periodically and/or upon request.

The unified imaging device 202 may further include one or more wired and/or wireless Input/Output (I/O) interfaces for connecting to the processing unit 204, for example, a network interface, a wireless network interface, a Radio Frequency (RF) channel, a Universal Serial Bus (USB) interface, a serial interface and/or the like.

Optionally, the unified imaging device 202 comprises one or more illumination light sources adapted to emit (flood) light to illuminate the scene 220, for example, visible light, infrared light and/or the like. The illumination light source(s) are not coherent light sources and are unrelated to the emission of the structured light pattern.

The processing unit 204 may include an I/O interface 230 for connecting to the unified imaging device 202, a processor(s) 232 for executing a process such as the process 100 and storage 234 for storing program code and/or data.

The I/O interface 230 may include one or wired and/or wireless interfaces providing the fusion system 200 connectivity to the unified imaging device 202, for example, a network interface, a wireless network interface, a Radio Frequency (RF) channel, a Universal Serial Bus (USB) interface, a serial interface and/or the like. Through the I/O interface 230, the processing unit 204 may receive sensory data from the unified imaging device 202, specifically images captured by the imaging sensor 212. Using the I/O interface 230, the processing unit 204 may also communicate with the unified imaging device 202 to control operation of the light source 210 and/or of the imaging sensor 212.

The processor(s) 232, homogenous or heterogeneous, may include one or more processing nodes arranged for parallel processing, as clusters and/or as one or more multi core processor(s).

The storage 234 may include one or more non-transitory memory devices, either persistent non-volatile devices, for example, a Read Only Memory (ROM), a Flash array, a hard drive, a solid state drive (SSD) and/or the like. The storage 234 may also include one or more volatile devices, for example, a Random Access Memory (RAM) device, a cache memory and/or the like.

The processor(s) 232 may execute one or more software modules, for example, a process, a script, an application, an agent, a utility, a tool and/or the like each comprising a plurality of program instructions stored in a non-transitory medium such as the storage 234 and executed by one or more processors such as the processor(s) 232. For example, the processor(s) 232 may execute an analyzer 240 for executing the process 100 to detect object(s) in the scene 220 including motion and/or micro-vibrations of the detected object(s). The analyzer 240 may further utilize one or more hardware elements may include, for example, a circuit, a component, an Integrated Circuit (IC), an Application Specific Integrated Circuit (ASIC), a Field Programmable Gate Array (FPGA), a Digital Signals Processor (DSP), a Graphic Processing Units (GPU) and/or the like for executing the process 100.

As shown at 102, the process 100 starts with the analyzer 240 receiving a plurality of images captured by the imaging sensor 212 depicting the scene 220. The analyzer 240 may operate the light source 210 to project the structured light pattern on the scene 220 and may further operate the imaging sensor 212 to capture the images of the scene 220.

As the imaging sensor 212 is adapted and/or configured to operate in the same wavelength spectrum as the light source 210 at least some of the images captured by the imaging sensor 212 include a reflection of at least some of the diffused light elements constituting the structured light pattern reflected by one or more objects present in the scene 220.

Optionally, the light source 210 is operated to periodically emit the structured light pattern such that a subset of images comprising one or more of the images captured by the imaging sensor 212 do not depict the reflection of the structured light pattern.

As shown at 104, the analyzer 240 may visually analyze one or more of the received images to detect and classify one or more objects present in the scene 220, for example, a human, an item and/or the like. The analyzer 240 may apply one or more machine learning models and/or algorithms, for example, a neural network, a Support Vector Machine (SVM), a decision tree learning algorithm, a K-Nearest neighbors algorithm and/or any other machine learning algorithm as known in the art trained to detect and/or classify the object(s) in the scene. The machine learning model(s) and/or algorithm(s) may be further trained to identify one or more attributes of the detected object(s), for example, a motion, a gesture, a facial expression, a bodily positioning, a limb positioning, a size, a shape and/or the like.

The machine learning model(s) and/or algorithm(s) may be constructed and trained to detect and classify the objects according to the visual data depicted in the image(s) where the visual data relates to the object(s) themselves and does not include the reflected structured light pattern reflected from the object(s). To prevent artifacts and/or visual affects induced by the reflected structured light pattern, the analyzer 240 may operate the light source 210 to periodically project the structured light pattern. Since the light source 210 and the imaging sensor 212 may be time synchronized, the analyzer 240 may operate the light source 210 to emit the structured light pattern every other frame captured by the imaging sensor, every 3rd frame, every 5th frame and/or the like.

Optionally, in order to improve accuracy of the detection and classification of the object(s) present in the scene 220, the machine learning model(s) and/or algorithm(s) may be constructed and trained to detect and classify the objects according to the visual data depicted in the image(s) comprising the structured light pattern reflected from the object(s). As such the machine learning model(s) and/or algorithm(s) may be trained to classify the objects and/or their attribute(s) according to both the visual properties of the object(s) as well as according to the depth data expressed by the light elements reflected from the object(s) and hence depicted in the image(s).

Figure 3:
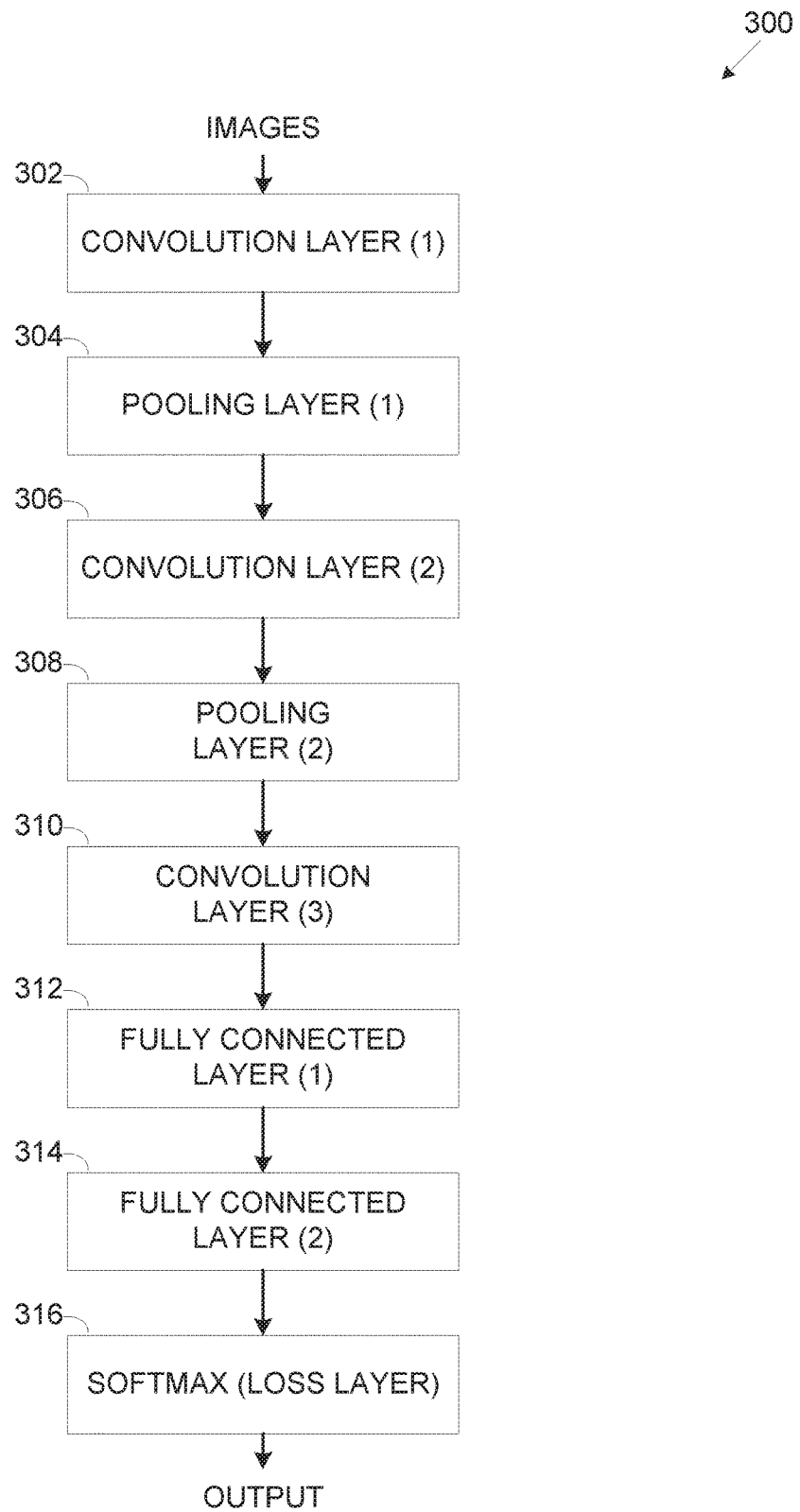
FIG. 3 is a schematic illustration of an exemplary neural network used for visually analyzing images captured by a unified imaging apparatus to detect and classify objects in a scene, according to some embodiments of the present invention.

Reference is now made to FIG. 3, which is a schematic illustration of an exemplary neural network used for visually analyzing images captured by a unified imaging apparatus to detect and classify objects in a scene, according to some embodiments of the present invention. An exemplary neural network 300, for example, a Convolutional Neural Network (CNN) and/or the like may be applied by an analyzer such as the analyzer 240 to detect and classify one or more objects in a scene such as the scene 220 and optionally one or more of the attributes of the object(s).

The analyzer 240 may apply the neural network 300 to visually analyze one or more of the captured the images which may include image(s) depicting the reflected structured light pattern and/or images that do not depict the reflected structured light pattern. Based on the implementation, the machine learning model(s) and/or algorithm(s) may be trained to detect and classify the objects according to the visual information of the objects and optionally according to the reflected structured light pattern expressing depth characteristics of the object(s).

The neural network 300 may include an input layer to receive the captured image(s), a first convolutional layer 302, a first polling (down sampling) layer 304, a second convolutional layer 306, a second polling layer 308, a third convolutional layer 310, a first fully connected layer 312, a second fully connected layer 314, a SOFTMAX loss layer 316 and an output layer outputting the estimated classification. The classification may typically include one or more class labels each associated with a probability score indicating the probability that a detect object is of the respective class.

The neural network 300 may be trained with a plurality of training datasets comprising a plurality of training images depicting a scene such as the scene 220, for example, a cabin of a vehicle and/or the like in which one or more objects are present, for example, a vehicle occupant (e.g. a driver, a passenger, a pet, etc.), an object of the cabin, an item associated with one or more of the vehicle occupant(s) and/or the like. Optionally, the neural network 300 is trained with a plurality of training datasets comprising a plurality of training images in which in addition to the visual data of the scene, the images depict the structured light pattern reflected from the object(s) in the scene.

Reference is made once again to FIG. 1.

As shown at 106, the analyzer 240 analyzes the position of one or more of the diffused light elements of the structured light pattern reflected from one or more object(s) in the scene 220 to extract depth data relating to the object(s) and optionally create one or more depth maps of the scene 220. The analyzer 240 may extract the depth data based on triangulation to identify the position of one or more of the reflected diffused light elements.

Figure 4:
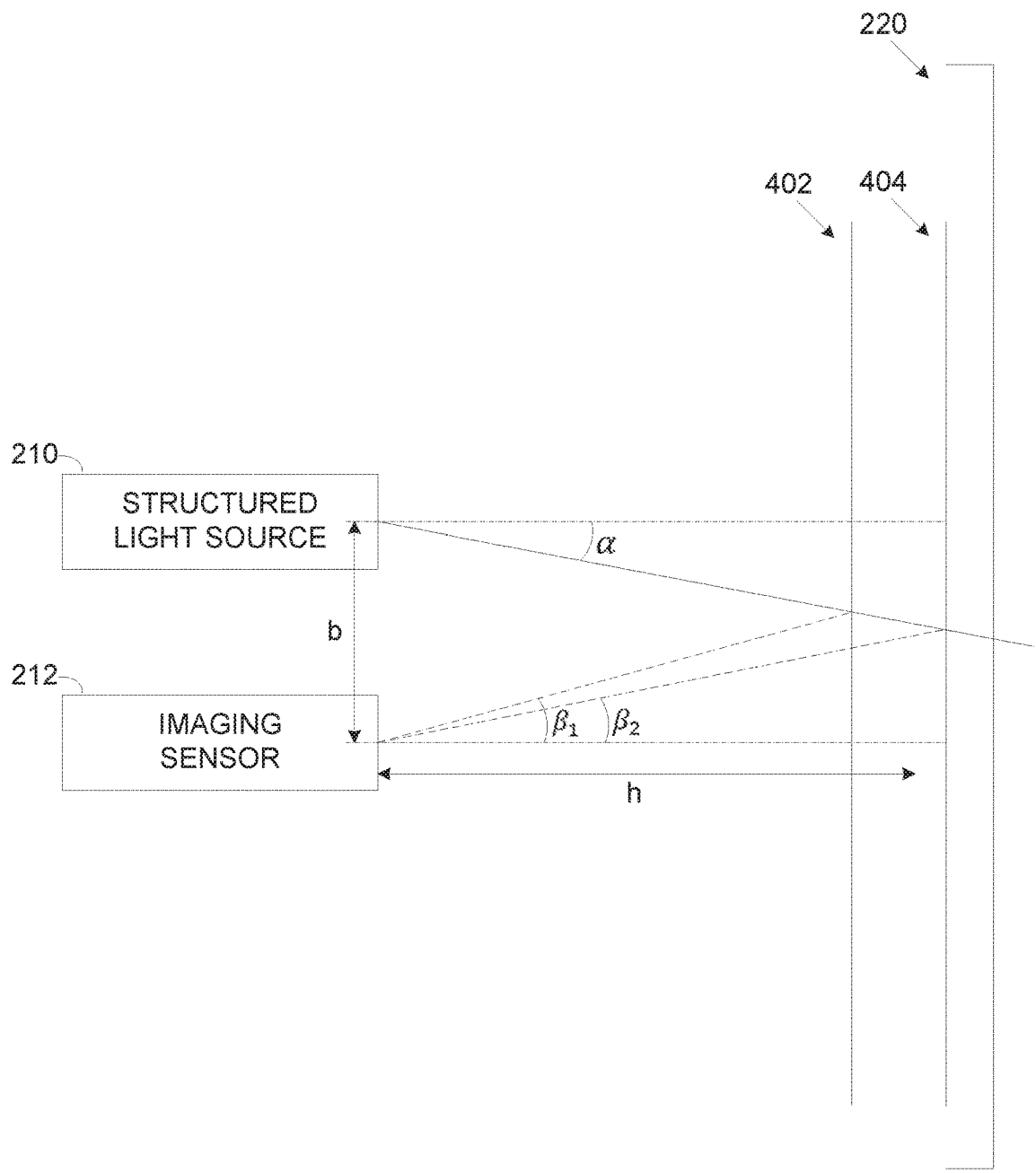
FIG. 4 is a schematic illustration of a scene monitored by an exemplary unified imaging apparatus to capture depth data, according to some embodiments of the present invention.

Reference is now made to FIG. 4, which is a schematic illustration of a scene monitored by an exemplary unified imaging apparatus to capture depth data, according to some embodiments of the present invention. The depth data may typically be extracted by analyzing the reflection of a structured light pattern comprising a plurality of diffused light elements. However, for brevity FIG. 4 presents a simplified light source 210, for example, a laser configured to emit a single laser beam projecting a structured light pattern comprising a single dot (light element) on a scene such as the scene 220.

The light source 210 emits the single laser beam at a predefined angle α with respect to a perpendicular axis of the emission surface of the light source 210. A baseline distance b between the center of the emission surface of the light source 210 and an imaging surface of an imaging sensor such as the imaging sensor 212 is known optionally by calibration.

A first surface 402 and a second surface 404 of one or more objects present in the scene 220 may reflect the laser beam towards the imaging sensor 212. As evident the first surface 402 is closer to the emission surface of the light source 210 compared to the second surface 404.

Depending on the distance of the surfaces from the emission surface of the light source 210 the same laser dot will be reflected to the imaging sensor 212 at a different angle β and hence depicted in different pixel(s) location in the captured images. For example, the light dot may be reflected from the first surface 402 (which is closer) at a larger angle $β_1$ compared to a reflection angle $β_2$ in which the light dot may be reflected from the second surface 404 (which is further).

An analyzer such as the analyzer 240 may analyze the image(s) captured by the imaging sensor 212 to calculate the angle(s) β in which the light dot is reflected from a certain surface. The analyzer may then calculate a distance h between the imaging surface of the imaging sensor 212 and the certain surface according to equation 1 below.

$$h = b\frac{\sin\alpha \sin\beta}{\sin(\alpha + \beta)} \qquad \text{Equation 1}$$

The calibration process applied to align the imaging sensor 212 with the light source 210 may be conducted with the calibration target object(s) to accurately map the light element(s) to the pixels and hence accurately calculate the angles $β_i$ thus accurately measuring the distance of the surface(s) using equation 1.

The analyzer 240 may apply the same computation for each diffused light element of a more complex structured light pattern projected by the light source 210 on the scene 220.

Moreover, all possible distances from which a single light dot projected by the light source 210 may be reflected constitute a line denoted as an epipolar line. For each of the diffused light elements, the analyzer 240 may therefore analyze the pixels corresponding (depicting) to the epipolar line. Reducing the analysis area of the image(s) to the analysis of the epipolar line regions associated with the light elements may significantly reduce computation resources (e.g. processing power, storage capacity, etc.) and/or time required for the analyzer to extract the depth data from the captured image(s).

Additionally and/or alternatively, the analyzer 240 may use a dataset, for example, a lookup table which correlates between each pixel in the captured image(s) and a respective distance. For every pixel in which the analyzer 240 detects a reflected light element, the analyzer 240 may search the lookup table to extract the correlated distance. The correlation between the pixels and the distances may be done as part of the calibration process in which each pixel is associated with a respective distance for each of the diffused light elements.

Reference is made once again to FIG. 1.

According to some embodiments of the present invention, the analyzer 240 may apply one or more of the machine learning models and/or algorithms, for example, the neural network and/or the like to the extracted depth data, specifically to the depth maps created for the scene 220 based on the extracted depth data. Moreover, to improve detection and classification of the object(s) present in the scene 220, the analyzer 240 may apply the machine learning model(s) and/or algorithm(s) to both the visual content of the captured images and to the depth maps derived from the depth data extracted from the captured image(s).

Figure 5:
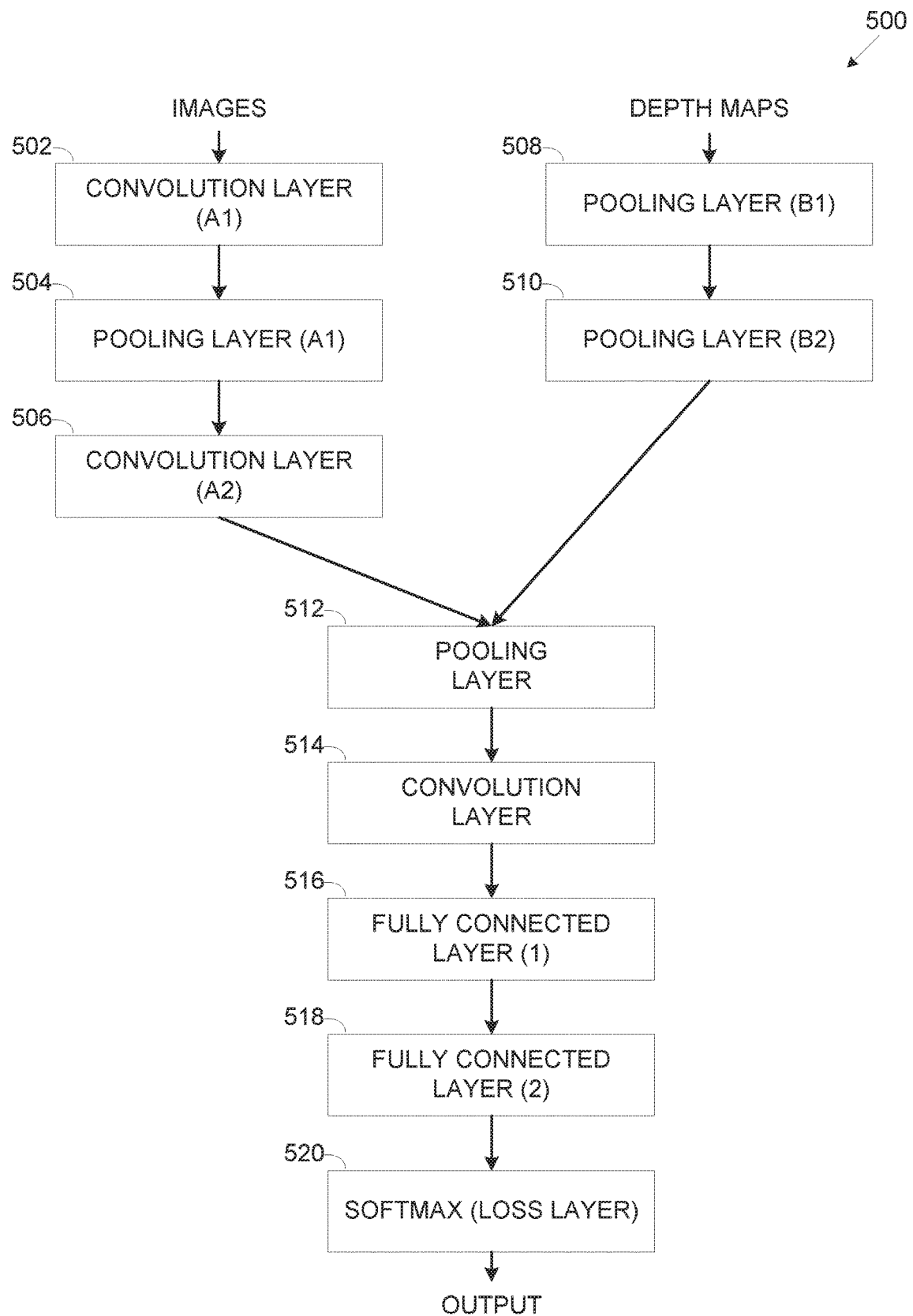
FIG. 5 is a schematic illustration of an exemplary neural network used for analyzing images captured by a unified imaging apparatus and depth data extracted from the images to detect and classify objects in a scene, according to some embodiments of the present invention.

Reference is now made to FIG. 5, which is a schematic illustration of an exemplary neural network used for analyzing images captured by a unified imaging apparatus and depth data extracted from the images to detect and classify objects in a scene, according to some embodiments of the present invention. An exemplary neural network 500, for example, a CNN and/or the like may be applied by an analyzer such as the analyzer 240 to analyze the two modalities, i.e. the visual content of the images(s) captured by an imaging sensor such as the imaging sensor 212 and the depth data extracted from the captured images(s) to detect and classify one or more objects in a scene such as the scene 220 and optionally one or more of the attributes of the object(s).

The exemplary neural network 500 may include two preliminary branches, the first for processing the captured image(s) and the second for processing the depth map(s) created for the scene 220 based on the depth data extracted from the captured image(s). The two branches merge after the initial processing to detect and classify the object(s) present in the scene 220. The visual processing branch may include an input layer to receive the captured image(s), a first convolutional layer (A1) 502, a polling layer (A1) 504 and a second convolutional layer (A2) 506. The depth data processing branch may include an input layer to receive the depth map(s), a first polling layer (B1) 508 and a second polling layer (B2) 510. The output of the second convolutional layer (A2) 506 and the second polling layer (B2) 510 merge to enter a joint pooling layer 512, a joint convolution layer 514, a first fully connected layer 516, a second fully connected layer 518, a SOFTMAX loss layer 520 and an output layer outputting the estimated classification. As described herein before, the classification may typically include one or more class labels each associated with a probability score indicating the probability that a detect object is of the respective class.

The neural network 500 may be trained with a plurality of training datasets comprising training images depicting a scene such as the scene 220 and training depth maps generated based on depth data extracted from at least some of the training images.

Reference is made once again to FIG. 1.

As shown at 108, the analyzer 240 may identify one or more micro-vibrations, for example, respiration, an eye movement, an eyelid movement, a subtle limb (hand, leg) movement, a subtle head movement and/or the like by analyzing at least some of the captured images to detect changes to a speckle pattern of one or more of the diffused light elements of the structured light pattern reflected back from the object(s) present in the scene 220. The changes to the speckle pattern may be indicative of micro-vibrations, i.e. very small and subtle movements that may be too minor to be detected by analyzing variations in the depth data extracted from the captured images.

For example, the analyzer 240 may detect the changes to the speckle pattern by measuring a temporal standard deviation in the intensity of the respective reflected diffused light element over multiple consecutive captured images to identify a temporal distortion pattern. Assuming $I_n$ is the gray level intensity a certain pixel depicting a reflected diffused light pattern and/or a part thereof in an image n. The analyzer 240 may calculate the temporal standard deviation according to equation 2 below.

$$S_n = \sum_{i=n-k}^{n} I_i^2 - \left(\sum_{i=n-k}^{n} I_i\right)^2 \qquad \text{Equation 2}$$

Where n is the current image and k is the number of previous images.

The analyzer 240 may compare the result of the temporal standard deviation to a predefined threshold value to determine whether a micro-vibration occurred. In case the temporal standard deviation value exceeds the predefined threshold, the analyzer 240 determines that a micro-vibration increased while in case the temporal standard deviation value does not exceed the predefined threshold, the analyzer 240 may determine no change in the micro-vibration has occurred.

The predefined threshold value may be fixed and set in advance. Optionally, the predefined threshold value is dynamically adjusted according to the value of the temporal standard deviation measured over time.

Optionally, in order to improve immunity to noise which may affect the intensity level of the speckle pattern and increase the Signal to Noise Ratio (SNR) of the intensity of the speckle pattern, the analyzer 240 may average the temporal standard deviation over multiple speckle patterns of diffused light elements reflected from the same surface and portrayed in the same region in the captured images.

In another example, the analyzer 240 may detect the changes to the speckle pattern by analyzing the speckle pattern for lateral translation which is indicative of a tilt of the speckle pattern with respect to the imaging sensor 212. The tilt which may be very minor, for example, on a scale of micro-radians may be derived from an angular velocity of one or more speckle pattern point(s) over time (consecutive frames). Assuming a constant intensity of the speckle pattern point(s) over time, the analyzer 240 may derive the angular velocity from analysis of the lateral translation of the speckle pattern point(s) of the diffused light element(s) depicted in a plurality of consecutive captured images according to equation 3 below.

$$v = \frac{\frac{dI}{dt}}{\frac{dI}{dx}} \qquad \text{Equation 3}$$

Where I is the intensity of the pixel in the captured image in gray level differentiated with respect to a time t or position x.

The angular velocity in a change of a certain pixel (i,j) with respect to its neighboring pixels in the i direction in captured image n may be expressed by equation 4 below.

$$v I_{i,j}^n \approx \frac{I_{i,j}^n - I_{i,j}^{n-1}}{I_{i+1,j}^n - I_{i-1,j}^n} \qquad \text{Equation 4}$$

The angular velocity in a change of a certain pixel (i,j) may be expressed similarly in the j direction. The result of the angular velocity is expressed in pixel per frame units.

Optionally, the analyzer 240 normalizes the intensity $I_{i,j}$ of the pixel (i,j) over time to compensate for non-uniformity in intensity $I_{i,j}$ due to spot intensity envelope effects. For example, the analyzer 240 may normalize the intensity $I_{i,j}$ by applying a sliding temporal window for averaging the intensity $I_{i,j}$ of one or more pixels (i,j) in the captured images.

In another example, the analyzer 240 may smooth the intensity $I_{i,j}$ in the time domain by applying an infinite impulse response to the $I_{i,j}$ to produce a smoothed intensity $\bar{I}_{i,j}$ as expressed in equation 5 below.

$$\bar{I}_{i,j} = \alpha I_{i,j}^n + (1-\alpha)\bar{I}_{i,j} \qquad \text{Equation 5}$$

Where $\alpha$ is a small factor, for example, 0.05.

The analyzer 240 may normalize the intensity $I_{i,j}$ of one or more of the pixels (i,j) by dividing it with the average intensity measured over time in a plurality of consecutive captured images to produce a normalized intensity $\hat{I}_{i,j}^n$ as expressed in equation 6 below.

$$\hat{I}_{i,j}^n \equiv \frac{I_{i,j}^n}{\bar{I}_{i,j}} \qquad \text{Equation 6}$$

Replacing the expression of the intensity $I_{i,j}^n$ in equation 4 with the normalized intensity $\hat{I}_{i,j}^n$, the angular velocity may be expressed by equation 7 below.

$$v I_{i,j}^n \approx \frac{\hat{I}_{i,j}^n - \hat{I}_{i,j}^{n-1}}{\hat{I}_{i+1,j}^n - \hat{I}_{i-1,j}^n} \qquad \text{Equation 7}$$

In order to further improve robustness of the measured intensity against noise effects, the analyzer 240 may further spatially average the intensity over multiple adjacent reflected diffused light elements (e.g. dots, spots, etc.) in the captured images. The analyzer 240 may further apply temporal filtering over the spatially averaged intensity value to improve the resulting intensity signal.

Further details on the speckle pattern analysis for detecting the micro-vibrations may be found in International Application No. IL2015/051255 (Publication WO2016/103271) entitled "System and Method for Detecting Surface Vibrations" filed Dec. 27, 2015, the contents of which are incorporated herein by reference in their entirety.

As shown at 110, the analyzer 240 may output the classification (class) of the object(s) detected in the scene, the attribute(s) (e.g. motion, gesture, facial expression, bodily positioning, limb positioning, size, shape, etc.), motion of the object(s) as derived from the depth data analysis and the micro-vibration(s) detected for the object(s). As described herein before, the classification may typically include one or more class labels each associated with a probability score indicating the probability that a detect object is of the respective class, for example, a vector, a list, a table and/or the like.

Since all modalities, i.e. the visual data, the depth data and the speckle pattern are all extracted from the same images, the classification, the motion and the micro-vibrations may be inherently registered (aligned) in the same coordinate system. As such the classification, the motion and the micro-vibrations may be easily correlated to the object(s) according to the spatial parameters (coordinates) of the data of each of the modalities which all refer to the same coordinate system.

The accuracy in associating the attributes, the motion and the micro-vibration(s) with the corresponding object(s) detected in the scene 220 may therefore be significantly improved.

When deployed in the vehicle cabin, the analyzer 240 may provide the object(s) class, attribute(s), motion and/or micro-vibration(s) to one or more vehicle related applications which may take advantage of the provided data. For example a driver monitoring safety system and/or application may analyze the data provided by the analyzer 240 to verify that the driver is awake and concentrated on driving the vehicle. In another example a passenger safety system and/or application may analyze the data provided by the analyzer 240 to verify that each vehicle occupant (e.g. driver, passenger) detected in the vehicle cabin is properly wearing his safety belt. In another example, the passenger safety system and/or application may analyze the data provided by the analyzer 240 to verify no infant(s) and/or pet(s) are forgotten in the cabin after other passenger(s) have left the scene. In another example, a passenger comfort system and/or application may adjust an air-conditioning system according to a count (number) of vehicle occupants detected in the cabin. In another example, an infotainment system and/or application may adjust one or more multimedia systems according to the count of the vehicle occupants detected in the cabin, specifically according to the location of the vehicle occupant(s) within the cabin, for example, a front seat, a back seat, a right side seat, a left side seat and/or the like. In another example, a vehicle security system and/or application may detect an intruder entering and/or attempting to enter the cabin.

It is expected that during the life of a patent maturing from this application many relevant systems, methods and computer programs will be developed and the scope of the terms structured light pattern and machine learning models are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of detecting objects, extracting depth information of the objects and identifying micro-vibrations of the objects using a unified imaging device, comprising:
   using at least one processor for:
      receiving a plurality of images of a scene captured by an imaging sensor of a unified imaging device comprising a light source adapted to project on the scene a predefined structured light pattern constructed of a plurality of diffused light elements;
      classifying at least one object present in the scene by visually analyzing at least one of the plurality of images;
      extracting depth data of the at least one object by analyzing a positon of at least one of the plurality of diffused light elements reflected from the at least one object;
      identifying at least one micro-vibration of the at least one object by analyzing a change in a speckle pattern of at least one of the plurality of reflected diffused light elements in at least some consecutive images of the plurality of images; and
      outputting the classification, the depth data and data of the at least one micro-vibration which are derived from the analyses of images captured by the imaging sensor and are hence inherently registered in a common coordinate system;
   wherein the change in the speckle pattern is identified by applying a speckle pattern translation to the speckle pattern to determine an angular velocity of at least one point in the speckle pattern with respect to at least one adjacent point in the speckle pattern, the angular velocity is indicative of the at least one micro-vibration.

2. The computer implemented method of claim 1, wherein the light source and the imaging sensor operate in a common light wavelength spectrum which is a member of a group consisting of: visible light, infrared light and ultraviolet light.

3. The computer implemented method of claim 1, wherein the classification, the depth data and the at least one micro-vibration derived from the analyses of images captured by the imaging sensor are time synchronized.

4. The computer implemented method of claim 1, wherein each of the plurality of diffused light elements is a member of a group consisting of: a dot, a spot, a line and a combination thereof.

5. The computer implemented method of claim 1, wherein the light source is further adapted to periodically emit the structured light pattern such that the reflected structured light pattern is depicted in a subset of the plurality of images.

6. The computer implemented method of claim 1, further comprising averaging the intensity of the at least one point by applying a temporal sliding window over the at least one point in multiple consecutive images of the plurality of images.

7. The computer implemented method of claim 1, further comprising averaging the intensity of the at least one point by applying an infinite response filter to the intensity of the at least one point and dividing a result of the filter by an averaged intensity calculated based on the intensity measured in multiple consecutive images of the plurality of images.

8. The computer implemented method of claim 1, further comprising averaging the intensity of the at least one point by calculating the intensity for multiple adjacent points in the speckle pattern.

9. The computer implemented method of claim 1, wherein the change in the speckle pattern is identified by analyzing a temporal standard deviation in an intensity of the at least one reflected diffused light element in the at least some consecutive images compared to a threshold value.

10. The computer implemented method of claim 9, further comprising averaging the temporal standard deviation by calculating the temporal standard deviation for multiple reflected diffused light elements reflected from a surface of the at least one object.

11. The computer implemented method of claim 1, wherein the scene is cabin of a vehicle.

12. The computer implemented method of claim 11, wherein the at least one micro-vibration is analyzed to derive at least one of: a vehicle occupants count, a position and movement of at least one vehicle occupant, a posture of at least one vehicle occupant, a head and body parts position of at least one vehicle occupant, an activity of at least one vehicle occupant and a presence of at least one item associated with at least one vehicle occupant.

13. The computer implemented method of claim 1, wherein the visual analysis comprising using at least one trained machine learning model for classifying the at least one object.

14. The computer implemented method of claim 13, wherein the at least one machine learning model is trained for classifying the at least one object based on the visual data depicted in the at least one image, the visual data comprising visual data of the at least one object and at least one of the reflected diffused light elements.

15. The computer implemented method of claim 13, wherein the at least one machine learning model is trained for classifying the at least one object according to visual data of the at least one object depicted in the at least one image combined with at least one depth map generated based on the extracted depth data.

16. A unified imaging device, comprising:

a light source adapted to project a predefined structured light pattern on a scene, the predefined structured light pattern comprising a plurality of diffused light elements; and an imaging sensor adapted to capture a plurality of images of the scene;

wherein at least some of the plurality of images are analyzed for classifying at least one object present in the scene, for extracting depth data of the at least one object and for identifying at least one micro-vibration of the at least one object by analyzing a change in a speckle pattern of at least one of the plurality of diffused light elements in at least some consecutive images of the plurality of images, the classification, the depth data and the at least one micro-vibration are derived from the simultaneous analyses of the at least some images and are hence inherently registered in a common coordinate system;

wherein the change in the speckle pattern is identified by applying a speckle pattern translation to the speckle pattern to determine an angular velocity of at least one point in the speckle pattern with respect to at least one adjacent point in the speckle pattern, the angular velocity is indicative of the at least one micro-vibration.

* * * * *